July 23, 1963 E. A. GOLDBERG 3,099,005

STABILIZED TRACKING SYSTEM

Filed Oct. 1, 1957

INVENTOR.
EDWIN A. GOLDBERG
BY J. L. Whittaker
ATTORNEY 3,099,005
Patented July 23, 1963

3,099,005

STABILIZED TRACKING SYSTEM

Edwin Allen Goldberg, Princeton Junction, N.J., assignor to Radio Corporation of America, a corporation of Delaware Filed Oct. 1, 1957, Ser. No. 688,805
6 Claims. (Cl. 343—7)

This invention relates to improved servo-systems and particularly to improved means for compensating for movement of the platform or other support on which the servo-system may be mounted.

In a number of applications it is desirable to maintain an element in a predetermined orientation in inertial space. For example, in airborne and shipborne radar applications, the directional radiation and reception must remain in a fixed orientation with respect to a target of interest even though the antenna support, the aerial or marine vehicle, may be changing its orientation in space. Other illustrations of such applications are airborne cameras and gyroscopes.

In such applications, space stabilization has been generally achieved heretofore through the use of gyros mounted on the element desired stable in space. These gyros measure the angular motions of that element with respect to inertial space. The outputs of these gyros are introduced through amplifiers into a servo-system which positions the element desired stable. Thus a closed loop system is established which operates to stabilize the pointing of the radiating element in space regardless of angular motions of the support. The quality of the performance of such a system is dependent upon the amount of loop gain which can be used. This is generally limited by physically realizable factors in the design of the gyros and the servo-system.

The frequency at which the loop gain equals unity is called the closed loop stabilization bandwidth. One requirement for a non-oscillatory closed loop system is that this bandwidth be less than the lowest resonant frequency of any component of the feedback loop, so that the gain around the loop will be less than unity at any such resonant frequency.

Another requirement for a non-conditional non-oscillatory closed loop is a phase shift of less than 180° around the loop at frequencies less than the closed loop bandwidth, which limits the rate of cut-off of the system to be less than 12 db/octave.

Therefore, since the rate of cut-off is limited, the bandwidth must be increased in order to increase the loop gain at any frequency. This requires that the components which compose the servo-system have no low resonant frequencies. This, in turn, creates more design problems, a greater degree of complication, and more expense in producing the servo-system.

A general object of this invention is to provide improved stabilization for servo-systems mounted on movable supports.

A further object is to provide such improved stabilization without increasing the closed loop stabilization bandwidth.

The foregoing objects are accomplished in accordance with this invention by measuring the motions of the support directly, obtaining an error signal which is a function of these motions, and applying the error signal to the servo-system, so that the motions of the support are corrected through an "open loop" control circuit. The term "open loop" as used herein, defines a circuit whose output signal does not affect its input signal. The servo-system drives the element desired stabilized in space, but has no control over the motions of the support, which governs the servo-system's input signal. Thus, the error signals resulting from the motions of the platform are applied "open loop" to the element desired stable. Such "open loop" applications do not require increased closed loop stabilization bandwidth to improve the stabilization of the element. The "open loop" gain may be made as high as necessary for low frequencies, and then have a rate of cut-off of greater than 12 db/octave without producing oscillations.

The invention will be described in greater detail by reference to the accompanying drawings wherein.

For convenience of description, the invention will be described in connection with an airborne radar system. However, as previously mentioned, the invention is useful in any application in which it is desired to maintain an element on a movable platform in a stable attitude.

Figure 1:
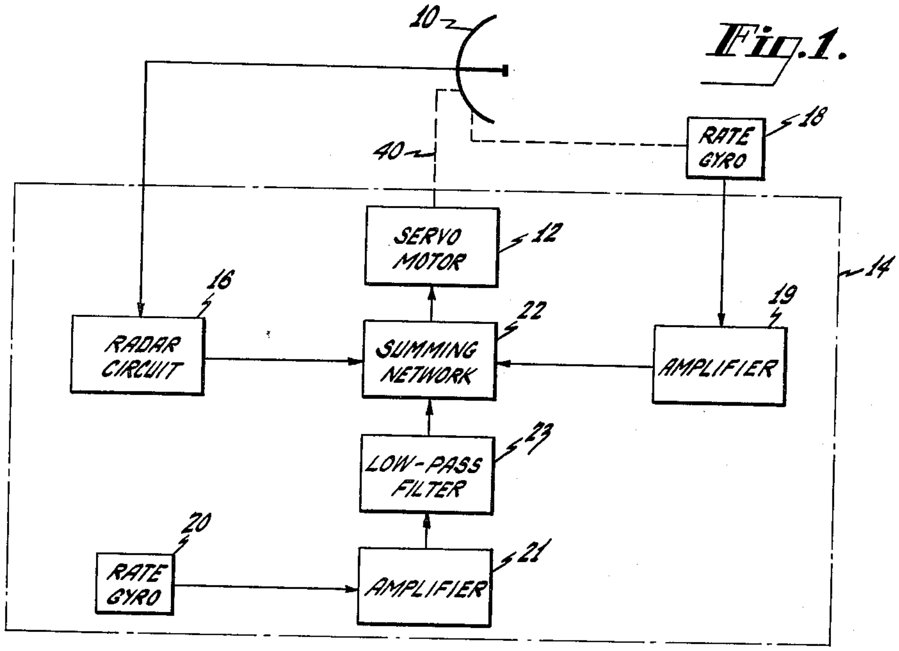
FIG. 1 is a block diagram of a portion of a preferred embodiment of the invention.

FIGURE 1 and the detailed description which follows relate to the stabilization of an element with respect to one degree of freedom only. In this example, the element is stabilized in an elevation plane which is perpendicular to the ground plane, that is, it is stabilized with respect to pitching movement. It is to be understood that the invention is equally applicable to the stabilizaion of an element with respect to other types of movement.

Referring to FIGURE 1, member 14, shown by dot-dash lines, represents the platform on which the system of this invention is mounted. The platform, for example, may be the airframe of an aerial vehicle. This platform, or the airframe of the aerial vehicle 14, is subject to random motions at least in the elevation plane with respect to inertial space due to turbulence of the air and the aerial vehicle's own maneuverings. The radar system includes an antenna 10, which is rotatable in azimuth and is movable in elevation, a drive motor 12, which drives the antenna 10 in the elevation direction only, and three control networks which control the positioning of antenna 10. Another motor, not shown, drives the antenna 10 in azimuth.

One control network is a first feedback path consisting of a radar circuit 16 of the automatic tracking type. It produces an error signal proportional to the angular displacement in the elevation plane of the target from the center of the beam radiated by antenna 10. This signal, known as an error signal, is applied to the summing network 22 whose output drives servo-motor 12. The purpose of this feedback path, as understood in the art, is to furnish signals for correcting the position of the antenna 10.

The second control network is a second feedback path consisting of a rate gyro 18 and an amplifier 19. The rate gyro 18, which is fixed to the antenna 10, senses the rate of elevation movement of the antenna 10 and produces an output signal having an amplitude proportional to this rate of movement. The output signal of rate gyro 18, known as a rate or speed signal, is amplified by amplifier 19 and applied to a summing network 22.

The system as described so far is conventional. The error signal output of the radar circuit 16 is applied through the summing network 22 to the drive motor 12 and causes the latter to drive the antenna 10 in a sense to reduce the error signal to zero. The rate signal output of the rate gyro 18, is applied through amplifier 19 and summing network 22 to the drive motor 12 in a sense to oppose the error signal. The function of the rate signal is to dampen the movement of the radar antenna 10 and thereby to prevent overshoot, and also to stabilize the antenna space orientation regardless of platform (14) motion even in the absence of a target.

As has already been mentioned, the above system has a number of disadvantages. The movement of the platform 14 on which the radar system is mounted affects the performance of the radar system. In order to have quick response, the system stabilization loop gain, that is, the gain in the feedback loop which includes the rate gyro 18, summing network 22, and drive motor 12, must be relatively high to compensate for the movement of the platform. However, the amount of gain which can be used in a closed loop is limited by the allowable bandwidth of the system, because of its rate of cut off limitations. The bandwidth in turn is limited in practice by the resonant frequencies of the gyros and the servo-system. As has been explained before, an object of this invention is to overcome the difficulties and expense inherent in raising their resonant frequencies.

The above inherent disadvantages of closed loop operation are overcome according to the present invention by using a third control network to apply a stabilizing signal to the system in "open loop" fashion. This third control network consists of a rate gyro 20 fixed to the platform 14, an amplifier 21, and a low-pass filter 23. The rate gyro 20 is fixed to platform 14, and senses the latter's angular motion in the elevation plane. The rate signal output of the rate gyro 20 is applied via amplifier 21 and low-pass filter 23 to the summing network 22. Since the input is dependent on the angular motion of the platform 14, and the output controls the antenna 10 and does not control the motions of the platform 14, this control circuit, including the rate gyro 20, is an "open loop" control circuit. This "open loop" control circuit may have a rate of cut off of greater than 12 db/octave without producing unstable oscillations. Therefore, the gain of this control network may be increased to any extent necessary at desired frequencies, and may be decreased to any extent necessary at undesired frequencies. An abrupt transititon from high gain to low gain is achieved by the low-pass filter 23 whose rate of cut off may be designated as high as necessary.

The inherent advantages of the system described above can be best understood by the mathematical analysis which follows. In this analysis, FIGURES 1, 2 and 3 will be referred to. There are three independent angles in this analysis. One is the angle $\theta_E$, which is the elevation angle between a line from the antenna to the target and a plane parallel to a reference plane (ground, in this example). The second is the angle $\theta_B$, which is the elevation angle between the support, or airframe, 14 and the reference plane. The third is the angle $\theta_S$, which is the elevation angle between the axis of the antenna and the reference plane. However, when airborne, relative angles, such as $(\theta_S-\theta_E)$ and $(\theta_S-\theta_B)$, are usually used directly.

Figure 2:
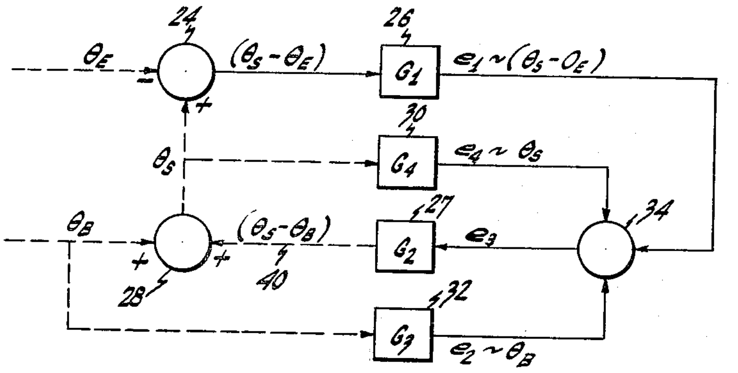
FIG. 2 is a block diagram showing the mathematical transfer functions which are used in determining the operating parameters of the circuit in FIG. 1.
Figure 3:
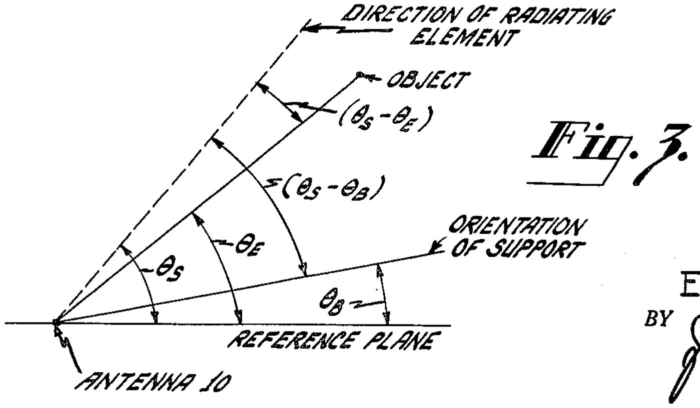
FIG. 3 is a sketch to illustrate the angular relationships among various elements of the system of FIG. 1.

In FIG. 2, the input $\theta_E$ is compared to $\theta_S$ in summing point 24 to represent the ability of the radar apparatus, including the radar circuit 16 and the antenna 10, to determine the angle $(\theta_S-\theta_E)$. Block 26, having a transfer of function $G_1$, represents the ability of this same apparatus to provide an output $e_1$ proportional to $(\theta_S-\theta_E)$. The apparatus necessary to perform the operations represented by summing point 24 and block 26 is the radar circuit 16 and the antenna 10.

The motor 12 is represented by block 27 having a transfer function $G_2$, and producing the angular position of the shaft 40 of the motor 12 as its output. The angle through which the shaft 40 is rotated by the motor 12 is the elevation angle of the antenna 10 with respect to the platform 14. Mathematically, this angle is represented by $\theta_S-\theta_B$. The input $\theta_B$ represents the effect of the elevation angle of the platform 14 on the motor 12 and therefore on the elevation angle of the antenna 10.

This input, the effect of $\theta_B$, is summed with the position of the shaft of the motor 12 at summing point 28 to form $\theta_S$, the antenna angle. Mathematically, when the elevation angle $\theta_B$ of the platform 14 is added to the angle $\theta_S-\theta_B$ of shaft 40 at summing point 28 a sum angle $\theta_B+\theta_S-\theta_B=\theta_S$ is obtained.

Block 30, having a transfer function $G_4$ and an input of $\theta_S$, represents the rate gyro 18 and the amplifier 19. The rate gyro 18 senses the rate of change of $\theta_S$ ($\dot{\theta}_S$) directly. The output signal of block 30, $e_4$, is a voltage proportional to $\dot{\theta}_S$.

Summing point 34 represents the summing network 22 of FIG. 1. It adds the signals from the control circuits and produces an input for block 27, the servo-motor 12.

Block 32, having a transfer function $G_3$ and an input of $\theta_B$, represents an important feature of the present invention. It includes the rate gyro 20, the amplifier 21, and the low-pass filter 23. The rate gyro 20 senses rate of change of $\theta_B$ ($\dot{\theta}_B$) directly. The output of block 32 is an error signal $e_2$ proportional to $\dot{\theta}_B$.

If a circuit of the type shown in FIG. 2, but having only the two feedback paths formed by block 26, having a transfer function of $G_1$, and block 30, having a transfer function of $G_4$, is solved for $\theta_S$:

$$\theta_S=\frac{G_1G_2}{1+G_2(G_1+G_4)}\theta_E+\frac{1}{1+G_2(G_1+G_4)}\theta_B$$

The last term in this equation represents the effect of the elevation angle of the platform 14 on the elevation angle of the antenna 10. In order to improve the stabilization of the antenna 10 to the motions of the platform 14, this term must be reduced. In order to stabilize completely for these motions of the platform 14, this term must be reduced to zero.

If the circuit actually shown in FIG. 2, including block 32, and therefore incorporating the invention disclosed herein, is solved for $\theta_S$:

$$\theta_S=\frac{G_1G_2}{1+G_2(G_1+G_4)}\theta_E+\frac{1-G_2G_3}{1+G_2(G_1+G_4)}\theta_B$$

Thus it can be seen that when the product $(G_2G_3)$ is between the limits zero and +2 the last term in the equation above is of lower magnitude than it would be without the open circuit loop of this invention. Preferably, the gain $G_3$ is adjusted to a value such that $G_2G_3$ is equal to 1, whereby the last term is eliminated completely. As has already been mentioned, any decrease in the magnitude of the last term of the equation above, means improved system stability to motions in the plane of interest (elevation in the example given). Furthermore, the improved system stability is achieved without increasing the closed loop stabilization bandwidth of the closed loops of the servo system.

Examples of radar circuits 16 usable in the circuit of FIGURE 1 are shown in the Radiation Laboratory Series, volume 20, pages 367–378. Such radar circuits 16 are capable of producing an error signal proportional to an angular discrepancy between the direction of the antenna 10 and the target. Examples of antennas 10 usable with such radar circuits 16 are shown in vol. 1, and design criteria are discussed in vol. 12 of that series. The rate gyros 18 and 20 may be of any standard type. Their manner of operation is explained in Bruns and Saunders, Feedback Control Systems, page 202. The amplifiers 19 and 21 may also be of any standard electronic type and are used to control the magnitude level of the error signals being fed into the summing network 22 from their respective gyroscopes. The summing network 22 may be a set of mixing resistors or a summing amplifier.

What is claimed is:

1. In a servo-system, of the type adapted to be mounted on a support which is capable of motion with respect to a reference plane, in combination, a first sensing means producing an error signal in response to the departure of an object, the position of which is being sensed, from a predetermined relationship between said object and said first sensing means, drive means responsive to said error signal and driving said first sensing means in a sense to reduce said error signal, and an open loop stabilization circuit comprising a second sensing means for sensing the rate of said motion and producing an output which is proportional thereto, and means for applying said output to said drive means.

2. In a servo-system of the type adapted to be mounted on a support which is movable with respect to a reference plane, in combination, first sensing means for producing an error signal indicative of the departure of an object, the position of which is being sensed, from a predetermined relationship between said object and said sensing means, driving means responsive to said error signal for driving said first sensing means in a sense to reduce said errior signal, second sensing means for producing and applying to said driving means an error signal indicative of the rate of motion of said support with respect to said reference plane, and third sensing means coupled to said first sensing means for producing and applying to said driving means an error signal indicative of the rate of motion of said first sensing means respect to said reference plane.

3. In a servo-system, of the type adapted to be mounted on a support which is capable of motion with respect to a reference plane, in combination, a directional sensing means producing an error signal in response to the departure of an object, the position of which is being sensed, from a predetermined relationship between said object and said directional sensing means, drive means responsive to said error signal and driving said directional sensing means in a sense to reduce said error signal, first rate of motion sensing means for producing and applying to said drive means an error signal indicative of the rate of motion of said directional sensing means, and stabilization means comprising a second rate of motion sensing means for sensing the rate of said motion of said support, producing an output proportional to said rate of said motion of said support, and applying said output to said drive means.

4. In a servo-system of the type adapted to be mounted on a support which is movable with respect to a reference plane, in combination, radar apparatus, including an antenna, for producing an error signal indicative of the departure of a target, the position of which is being sensed, from a predetermined relationship between said target and said antenna, a summing network responsive in part to said radar apparatus, a servo-motor responsive to said summing network for driving said antenna in a sense to reduce said error signal, a first rate gyroscope coupled to said antenna for producing and applying to said summing network an output signal indicative of the rate of motion of said antenna with respect to said reference plane, and a second rate gyroscope for producing and applying to said summing network an output signal output indicative of the rate of motion of said support with respect to said reference plane.

5. In a positioning servo-system, of the type adapted to be mounted on a support which is movable with respect to a reference plane, in combination radar apparatus, including an antenna for producing an error signal in response to the departure of a target, the position of which is being sensed, from a predetermined relationship between said target and said antenna, a servo-motor responsive to said error signal and driving said antenna in a sense to reduce said error signal, a first rate gyroscope for producing and applying to said servo-motor an output signal indicative of the rate of motion of said antenna, and stabilization means comprising a second rate gyroscope for sensing the rate of motion of said support, producing an output proportional to said rate of motion of said support, and applying said output to said servo-motor.

6. In a closed loop servo-system of the type adapted to be mounted on a support which is capable of motion with respect to a reference plane, and including radar apparatus, having a transfer function $G_1$, including an antenna at an angle $\theta_S$ to said reference plane, for producing an error signal $e_1$ in response to the departure of a target, the position of which is being sensed and whose position is measured by $\theta_E$=the angle between a line of said target to said antenna and said reference plane, from a predetermined relationship between said target and said antenna; a servomotor having a transfer function $G_2$, responsive to $e_1$ for driving said antenna in a sense to reduce $e_1$ to zero, where $e_1$ is proportional to $(\theta_s-\theta_E)$, the angular departure from said predetermined relationship; a first rate gyroscope coupled to said antenna for producing and applying to said servo-motor an error signal $e_4$ indicative of the rate of motion of said antenna, where $e_1+e_4=e_3$ and where $e_4$ is the total signal driving the servo-motor; and:

$$e_3=\left(\frac{1}{1+G_2(G_1+G_4)}\theta_B-\frac{1}{1+G_2(G_1G_2)}\theta_E\right)K$$

where $\theta_B$ is the angle of said support with respect to said reference plane, and where K is a constant factor having the units of volts/radian; stabilization means, having a transfer function $G_3$, comprising a second rate gyro adapted to be mounted to said support for sensing angular motion of said support and applying an error signal $e_2$ to said servo-motor in response to said motion of said support, of sufficient magnitude to change $$e_3=e_1+e_4 \text{ to } e_3=e_1+e_4+e_2$$

where $$e_2=\left(\frac{-G_2G_3}{1+G_2(G_1+G_4)}\theta_B\right)K$$

and $0<G_2G_3<+2$.

References Cited in the file of this patent

UNITED STATES PATENTS

| | | |
|---|---|---|
| 2,414,108 | Knowles | Jan. 14, 1947 |
| 2,586,817 | Harris | Feb. 26, 1952 |
| 2,604,698 | Ewing | July 29, 1952 |
| 2,705,792 | Harris | Apr. 5, 1955 |
| 2,752,792 | Draper | July 3, 1956 |
| 2,947,986 | Marner et al. | Aug. 2, 1960 |